(12) United States Patent
Tischer (10) Patent No.: US 7,379,904 B2
(45) Date of Patent: May 27, 2008

(54) METHOD AND STORAGE MEDIUM FOR OBTAINING AN OFFER FOR A SALE OF A PRODUCT OR A SERVICE

(75) Inventor: Steven Tischer, Atlanta, GA (US)

(73) Assignees: AT&T Delaware Intellectual Property, Inc., Wilmington, DE (US); f/k/a BellSouth Intellectual Property Corporation, Wilmington, DE (US)

( * ) Notice: Subject to any disclaimer, the term of this patent is extended or adjusted under 35 U.S.C. 154(b) by 169 days.

(21) Appl. No.: 10/777,358

(22) Filed: Feb. 12, 2004

(65) Prior Publication Data

US 2005/0182683 A1  Aug. 18, 2005

(51) Int. Cl.
*G06Q 30/00* (2006.01)
*G06F 17/30* (2006.01)

(52) U.S. Cl. .............................. 705/26; 705/1; 705/27; 455/71; 455/93; 455/403

(58) Field of Classification Search ............. 705/26–27, 705/1, 37, 14; 235/383, 492; 455/73, 91, 455/403
See application file for complete search history.

(56) References Cited

U.S. PATENT DOCUMENTS

| | | | | |
|---|---|---|---|---|
| 5,136,501 | A * | 8/1992 | Silverman et al. | 705/37 |
| 5,794,207 | A * | 8/1998 | Walker et al. | 705/1 |
| 5,959,568 | A * | 9/1999 | Woolley | 342/42 |
| 6,250,557 | B1 * | 6/2001 | Forslund et al. | 235/492 |
| 6,389,269 | B1 * | 5/2002 | Nanni et al. | 455/93 |
| 6,587,835 | B1 * | 7/2003 | Treyz et al. | 705/14 |
| 6,934,372 | B1 * | 8/2005 | Lynam et al. | 379/111 |
| 2001/0013011 | A1 * | 8/2001 | Day et al. | 705/14 |
| 2002/0007324 | A1 * | 1/2002 | Centner et al. | 705/26 |
| 2002/0049644 | A1 * | 4/2002 | Kargman | 705/26 |
| 2002/0095340 | A1 * | 7/2002 | Vermande | 705/14 |
| 2002/0133424 | A1 * | 9/2002 | Joao | 705/26 |
| 2002/0147658 | A1 * | 10/2002 | Kwan | 705/26 |
| 2002/0161638 | A1 * | 10/2002 | Ogawa | 705/14 |
| 2002/0183013 | A1 * | 12/2002 | Auckland et al. | 455/73 |
| 2003/0055723 | A1 * | 3/2003 | English | 705/14 |
| 2003/0154135 | A1 * | 8/2003 | Covington et al. | 705/26 |

(Continued)

OTHER PUBLICATIONS

Williams, kathy. Strategic Finance."Tom D'Angelo priceline.com's Mr. Inside". Jul. 2002. vol. 84, Iss. 1; p. 22, 7pgs.Extracted from Proquest on Sep. 21, 2005.*

(Continued)

*Primary Examiner*—Naeem Haq
*Assistant Examiner*—William J. Allen
(74) *Attorney, Agent, or Firm*—Gantor Colburn LLP (57) ABSTRACT

Systems and methods for obtaining an offer for a sale of a desired product or a service are provided. The method includes iteratively transmitting a first signal including a first data message using a mobile transceiver device. Each of the first data messages includes information relating to the desired product or service. The method further includes receiving at least one of the first signals having the first data message and determining whether a product or service provider has the desired product or service available for sale. Finally, the method includes transmitting a second signal including a second data message to the mobile transceiver device. The second data message includes an offer to sell the desired product or service.

19 Claims, 4 Drawing Sheets

U.S. PATENT DOCUMENTS

2004/0015403 A1* 1/2004 Moskowitz et al. .......... 705/26
2004/0064378 A1* 4/2004 Yoshida ........................ 705/26
2005/0091118 A1* 4/2005 Fano ............................ 705/26
2005/0160014 A1* 7/2005 Moss et al. ................... 705/26
2006/0271428 A1* 11/2006 Barlow ........................ 705/14

OTHER PUBLICATIONS www.electronics.howstuffworks.com/cell-phones8.htm.May 8, 2007. Recovered from www.HowStuffWorks.com on May 8, 2007.*

Multi-Standard Mobile Phones Sweden: New GSM 900/DCS 1800 Ericsson Phone☐☐Press Release , Mar. 14, 1996 , p. 1 [obtained from Dialog database on Oct. 3, 2008].*

Performance and channel coding trade-offs in orthogonal CDMA. Mehio, Rami. M.Eng. , 1997 , McGill University (Canada) [recovered from Dialog database on Oct. 3, 2008].*

* cited by examiner

Figure 1

Product/Service Description: Pioneer Car Radio XK102
Desired Price Range: $90.00 -$120.00
Request Expiration Date: 10 January 04, 3:15 P.M.
Requester ID: Stew333

*Figure 2*

Product/Service Description: Pioneer Car Radio XK102
Offering Price : $95.00
Offeror Name: XYZ Corporation
Offer Expiration Date: 09 January 04, 5:00 P.M.
Offeror ID: XYZ 100

*Figure 3*

Product/Service Description: Pioneer Car Radio XK102
Offering Price : $110.00
Offeror Name: XXX Corporation
Offer Expiration Date: 09 January 04, 3:15 P.M.
Offeror ID: XXX 200

METHOD AND STORAGE MEDIUM FOR OBTAINING AN OFFER FOR A SALE OF A PRODUCT OR A SERVICE

FIELD OF INVENTION

The present invention relates to systems, methods, and a storage medium for automatically obtaining an offer for a sale of a desired product or a service.

BACKGROUND

Consumers many times desire to purchase a product or service at a particular price. To find a provider or seller of the desired products or services and a sales price thereof, consumers may review newspaper advertisements, magazine advertisements, or catalog advertisements. Reviewing these sources of information may consume consider amounts of time since the advertisements may not be directed to the desired product or service. In contrast, the advertisements may list numerous products or services that a consumer is not interested in purchasing. Accordingly, there is a need for an automated system that would obtain an offer for sale of the desired product or service that a consumer is interested in purchasing.

SUMMARY OF THE INVENTION

A method for obtaining an offer for a sale of a desired product or service using electronic devices is provided. The method includes iteratively transmitting a first signal including a first data message using a mobile transceiver device. Each of the first data messages includes information relating to the desired product or service. The method further includes receiving at least one of the first signals having the first data message and determining whether a product or service provider has the desired product or service available for sale. Finally, the method includes transmitting a second signal including a second data message to the mobile transceiver device. The second data message includes an offer to sell the desired product or service.

A system for obtaining an offer for a sale of a desired product or service is provided. The system includes a mobile transceiver device iteratively transmitting a first signal including a first data message. The first data message includes information relating to the desired product or service. The system further includes a second transceiver device receiving at least one of the first signals and routing the first data message to a computer server. Finally, the system includes a computer server having a database identifying products or services. The computer server searches the database to determine whether a product or service provider has the desired product or service available for sale. When the product or service provider has the desired product or service available for sale, the computer server generates a second data message including an offer to sell the desired product or service and sends the second data message to the second transceiver device. The second transceiver device transmits a second signal having the second data message to the mobile transceiver device.

A storage medium encoded with machine-readable computer program code for obtaining an offer for a sale of a desired product or service is provided. The storage medium includes instructions for causing at least one device operatively associated with a system to implement a method comprising iteratively transmitting a first signal including a first data message using a mobile transceiver device. Each of the first data messages has information relating to the desired product or service.

The method further includes receiving at least one of the first signals having the first data message and determining whether a product or service provider has the desired product or service available for sale. The method further includes transmitting a second signal having a second data message to the mobile transceiver device. The second data message contains an offer to sell the desired product or service.

Other systems, methods, and computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION OF THE INVENTION

Figure 1:
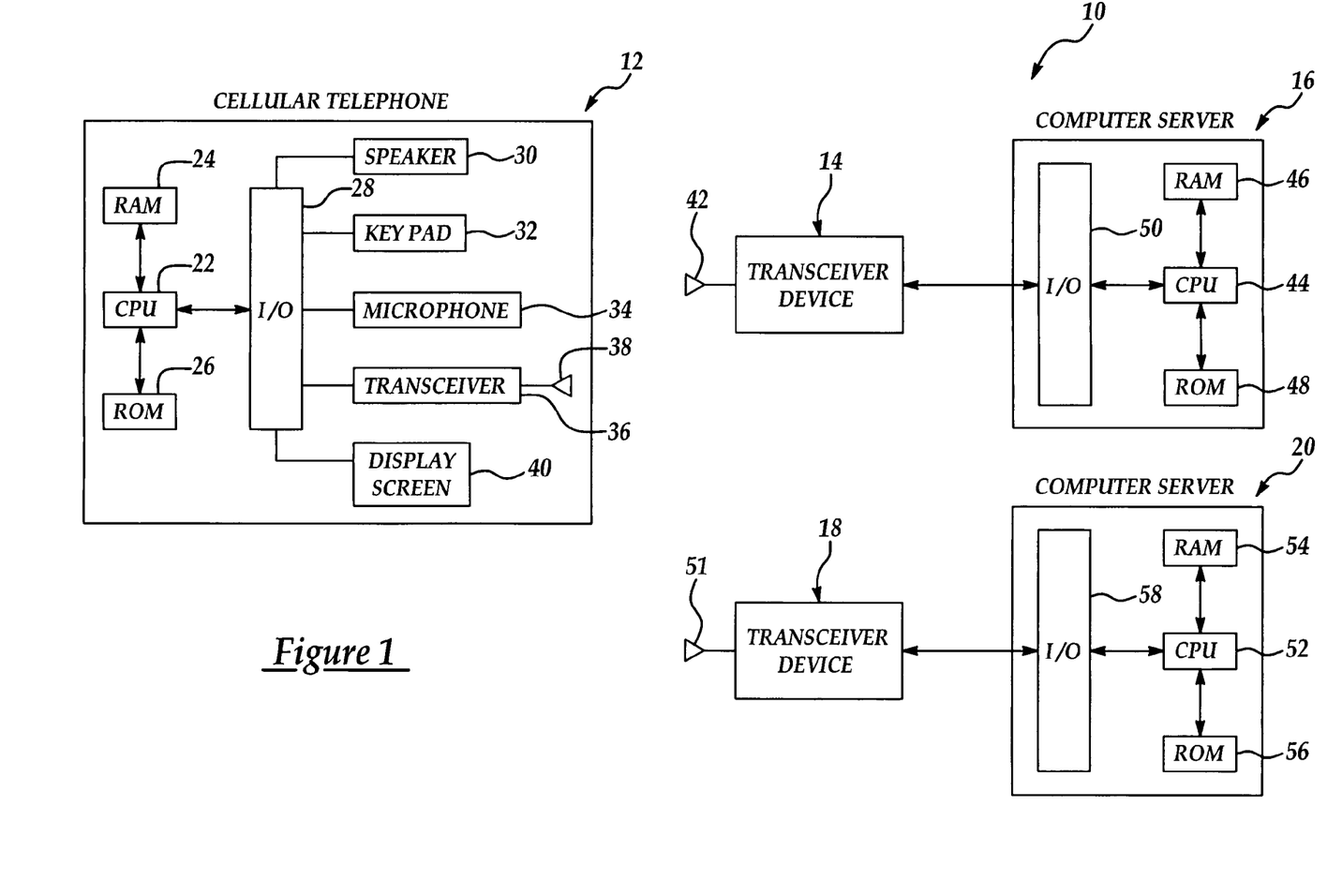
FIG. 1 is a schematic of a system for obtaining an offer for a sale of a product or service.

Referring to the drawings, identical reference numerals represent identical components in the various views. Referring to FIG. 1, a system 10 for obtaining an offer for sale of a product or a service is provided. System 10 allows an operator of a cellular telephone 12 to input information related to a desired product or service. In an alternate embodiment, system 10 determines a desired product or service from the behavior patterns of the user of telephone 12, as described in commonly owned U.S. patent application Ser. No. 10/736,470 filed on Dec. 15, 2003. Cellular telephone 12 transmits or broadcasts a data message containing a description of the desired product or services in order to obtain an offer from a desired product or service provider to sell a desired product or service.

As shown, system 10 includes a mobile transceiver device such as cellular telephone 12, a transceiver device 14, and a computer server 16. System 10 may further include a transceiver device 18 and a computer server 20. The computer server 16 may be associated with a first product or service provider and computer server 20 may be associated with a second product or service provider.

For purposes of discussion, a mobile transceiver device comprises any mobile electronic device that can transmit and receive radio frequency ("RF") signals. For example, mobile transceiver device can comprise: (i) a cellular telephone 12 or (ii) a personal data assistant ("PDA") having an internal transceiver. As shown, cellular telephone 12 includes a microprocessor 22 that communicates with various computer readable storage medium. The computer readable storage media preferably includes nonvolatile and volatile storage in a read-only memory ROM 26 and a random access memory RAM 24. The computer readable medium may be implemented using any of a number of known memory devices such as PROMs, EPROMs, EEPROMs, flash memory or any other electric, magnetic, optical or combination memory device capable of storing data, some of which represent executable instructions used by microprocessor 22. Microprocessor 22 communicates with various components of telephone 12 via I/O interface 28.

Cellular telephone 12 further includes a speaker 30, a keypad 32, a microphone 34, a transceiver 36, and a display screen 40. Speaker 30 is provided to generate sound in response to signals received from transceiver 36. Speaker 30 is operably coupled to transceiver 36 via I/O interface 28. Microphone 34 is provided to generate signals in response to sound generated by a user of telephone 12 that is received by transceiver 36. Microphone 34 is operably coupled to transceiver 36 via I/O interface 28.

Figure 2:
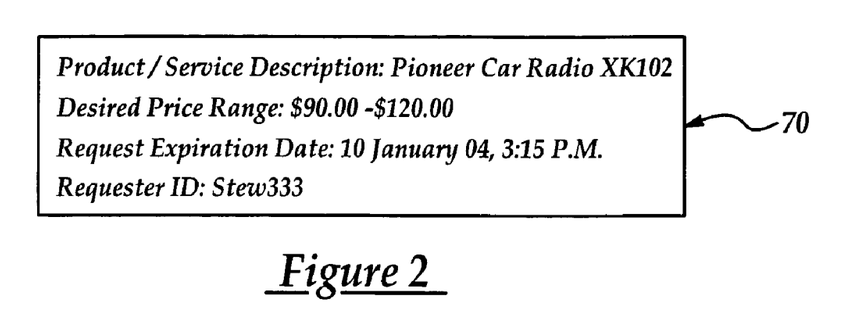
FIG. 2 is a schematic of a data message containing information relating to the desired product or service.

Referring to FIGS. 1 and 2, transceiver 36 is provided to transmit and receive RF communication signals via antenna 38. As shown, transceiver 36 is operably coupled to CPU 22 via I/O interface 28. In order to obtain an offer for sale or an advertisement related to a desired product or service, CPU 22 periodically induces transceiver 36 to transmit an RF signal containing a data message, such as data message 70 for example, including information describing a desired product or service. In particular, transceiver 36 may be configured to transmit and receive RF signals based on one or more communication standards. For example, the RF signals can be based on one or more of the 802 communication standards, developed the IEEE, including: (i) the 802.11a standard also known as WiFi, (ii) the 802.11b standard, (iii) the 802.11g standard, (iv) the 802.15.1 standard, (v) the 802.15.3 standard, and the (vi) 802.16 standard, or the like. Further, for example, the RF signals could be based on one or more of the CDMA standard, the TDMA standard, or the GSM standard, or the like. In particular, the transceiver 36 may transmit and receive RF signals in at least two or more communication standards or protocols. In other words, the transceiver can cycle through multiple communication standards or protocols and transmit RF messages in each communication standard or protocol. Further, the transceiver 36 can detect an RF transmission in a particular communication standard or protocol from another device and then transmit RF messages in the predetermined communication standard in an attempt to set up a communication session with the other transmitting device. In an alternate embodiment, transceiver 36 could be configured to transmit and receive modulated light signals.

It should be noted that the transmission of the RF signals from transceiver 36 including information relating to a desired product or service, may not be transmitted to a predetermined or pre-specified product or service provider. Instead, the RF signals are broadcast and any product or service provider with a transceiver device within a broadcast range of the mobile transceiver device 12 can receive the RF signals.

Keypad 32 is provided to allow a user of cellular telephone 12 to input information relating to a desired product or service into a memory associated with CPU 22. In particular, CPU 22 may generate information prompts on display screen 40 to obtain information on a user's desired products or services. Keypad 32 is operably coupled to CPU 22 via I/O interface 28.

Referring to FIG. 2, an exemplary data message is shown that contains information relating to a user's desired products or services. In particular, CPU 22 may query the user of cellular telephone 12, on display screen 40, to have the user input information relating to the following information fields: (i) Product/Service Description, (ii) Desired Price Range, (iii) Request Expiration Date, and (iv) a Requester ID—in order to generate a data message 70. The Product/Service Description field corresponds to a title of a desired product or service. For example, Product/Service Description field could contain the following information: "Pioneer Car Radio XK102", when the user is interested in purchasing a car radio. The Desired Price Range field corresponds to a price range that a user of cellular telephone 32 would be willing to pay for the product or service described in the Product/Service Description field. For example, the Desired Price Range field could contain the following information: "$90-120", indicating that the user would pay between $90 and $100 for the car radio. The Request Expiration Date corresponds to the date and time, after which the user would not want to receive for sale for the product or service identified in the Product/Service Description field. It should be noted that the structure and content of the data message 70 could vary from the structure shown in FIG. 2. For example, the data message 70 could be modified to correspond to a standard data message format desired by a predetermined service or product provider.

Transceiver device 14 is provided to receive RF signals from cellular telephone 12 and to transmit RF signals to telephone 12. In particular, device 14 can receive a signal having a data message from computer server 16 identifying a desired product or service. Thereafter, device 14 can transmit a signal containing a data message to cellular telephone 12 having an offer to sell the desired product or service. The device 14 is configured to transmit RF signals based on one or more communication standards. For example, the RF signals can be based on one or more of the 802 communication standards, developed the IEEE, including: (i) the 802.1a standard also known as WiFi, (ii) the 802.11b standard, (iii) the 802.11g standard, (iv) the 802.15.1 standard, (v) the 802.15.3 standard, and the (vi) 802.16 standard, or the like. Further, for example, the RF signals could be based on one or more of the CDMA standard, the TDMA standard, or the GSM standard, or the like. In particular, the device 14 may transmit and receive RF signals in at least two or more communication standards or protocols. In other words, the transceiver can cycle through multiple communication standards or protocols and transmit RF messages in each communication standard or protocol. Further, the device 14 can detect an RF transmission in a particular communication standard or protocol from another device and then transmit RF messages in the predetermined communication standard in an attempt to set up a communication session with the other transmitting device. As shown, device 14 communicates with CPU 44 via I/O interface 50.

In an alternate embodiment, device 14 could communicate with CPU 44 via a wireless communication network. In such an alternate embodiment, device 14 could be a mobile transceiver device. In another alternate embodiment, device 14 could be configured to transmit and receive modulated light signals.

Transceiver device 18 is provided to receive RF signals from cellular telephone 12 and to transmit RF signals to telephone 12. In particular, device 18 can receive a signal having a data message from computer server 20 identifying a desired product or service. Thereafter, device 18 can transmit a signal containing a data message to cellular telephone 12 having an offer to sell the desired product or service. The device 18 is configured to transmit RF signals based on one or more of the communication standards described above with respect to transceiver device 14. As shown, device 18 communicates with CPU 52 via I/O interface 58.

In an alternate embodiment, device 18 could communicate with CPU 52 via a wireless communication network. In such an alternate embodiment, device 18 could be a mobile transceiver device. In another alternate embodiment, device 18 could be configured to transmit and receive modulated light signals.

Referring to FIGS. 1 and 2, computer server 16 can receive a first data message (e.g., data message 70) containing information relating to desired product or service, from cellular telephone 12 via transceiver device 14. The computer server 16 is further provided to determine whether a first product or service provider (e.g. seller of the desired product or service) associated with computer server 16 has the desired product or service available for sale. As shown, computer server 16 includes a CPU 44 operably coupled to a RAM 46, a ROM 48, and an I/O interface 50.

Figure 3:
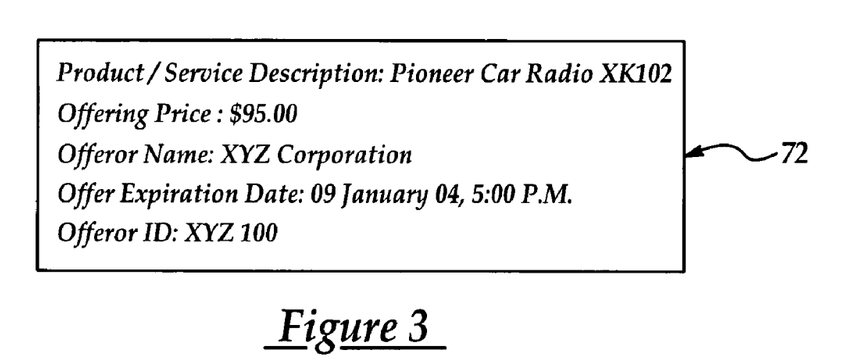
FIG. 3 is a schematic of a data message containing an offer to sell a desired product or service from a first product provider.

Referring to FIGS. 1 and 3, computer server 16 may have a database (not shown) stored in ROM 48 containing a list of a plurality of products or services, or both products and services available for sale by a first product or service provider (e.g. XYZ Corporation). For example, the database in ROM 48 can contain the following fields: (i) Product/Service Description, (ii) Offering Price, (iii) Offeror Name, (iv) Offer Expiration Date, and (v) Offeror ID. CPU 44 can determine whether a Product/Service Description data contained in the first data message corresponds to a Product/Service Description data in the database stored in ROM 48. When a desired product or service associated with the Product/Service Description field of the first data message corresponds to a Product/Service Description field in the database of ROM 48, CPU 44 generates a second data message, such as second data message 72, containing an offer to sell the desired product or service.

The remaining fields-in the second data message 72 will now be explained. The Offeror Name field corresponds to the name of the product or service provider offering a desired product or service for sale. For example, the Offeror field could contain the following information: "XYZ Corporation", indicating that offer or of the product or service is XYZ Corporation. The Offer Expiration Date field corresponds to the date and time in which the offer to sell the desired product or service expires or is not longer valid. The Offeror ID field corresponds to an identifier used by system 10 for directing the second data message to cellular telephone 12. For example, the Offeror ID field could contain the following information: "XYZ 100", corresponding to routing information for communicating with cellular telephone 12.

After CPU 44 generates the second data message 72 containing an offer for sale, CPU 44 transmits the second data message 72 via I/O interface 50 to transceiver device 14. Thereafter, device 14 generates a second signal containing the second data message 72 and transmits the second signal to cellular telephone 12.

Computer server 20 can receive a first data message (e.g., data message 70) containing information relating to desired product or service, from cellular telephone 12 via transceiver device 51. Computer server 18 can further determine whether a first product or service provider (e.g., seller or manufacturer) associated with computer server 20 has the desired product or service available for sale. As shown, computer server 20 includes a CPU 52 operably coupled to a RAM 54, a ROM 56, and an I/O interface 58.

Figure 4:
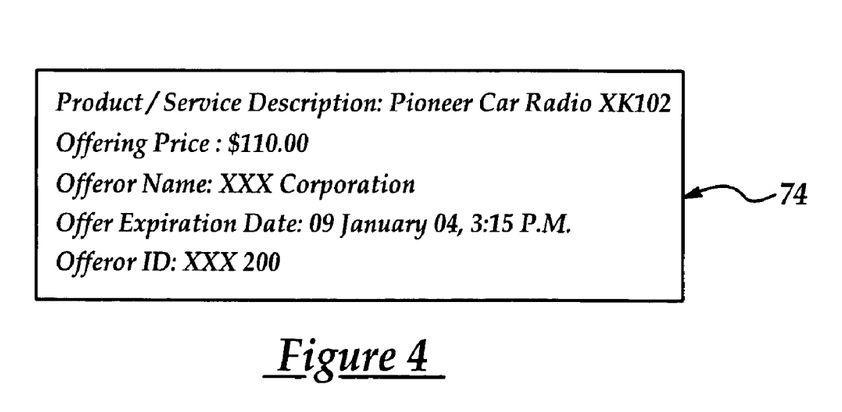
FIG. 4 is a schematic of a data message containing an offer to sell a desired product or service from a second product provider.

Referring to FIGS. 1 and 4, computer server 20 may have a database (not shown) stored in ROM 56 containing a list of a plurality of products or services (or both products and services) available for sale by a second product or service provider (e.g., XXX Corporation). For example, the database in ROM 56 can contain the following fields: (i) Product/Service Description, (ii) Offering Price, (iii) Offeror Name, (iv) Offer Expiration Date, and (v) Offeror ID, like the database stored in ROM 48 discussed above. CPU 52 can determine whether a Product/Service Description field contained in the first data message corresponds to a Product/Service Description data in the database stored in ROM 56. When a desired product or service associated with the Product/Service Description field of the first data message corresponds to Product/Service Description data in the database of ROM 56, CPU 52 generates a third data message, such as data message 74, containing an offer to sell the desired product or service.

After CPU 52 generates the third data message 74 containing an offer for sale, CPU 52 transmits the third data message 74 via I/O interface 50 to transceiver device 18. Thereafter, device 18 generates a third signal containing the third data message 74 and transmits the third signal to cellular telephone 12.

Thus, cellular phone 12 can communicate with a plurality of devices (e.g. computer servers 16, 20) to obtain a plurality of offers or advertisements associated with a desired product or services.

Figure 5:
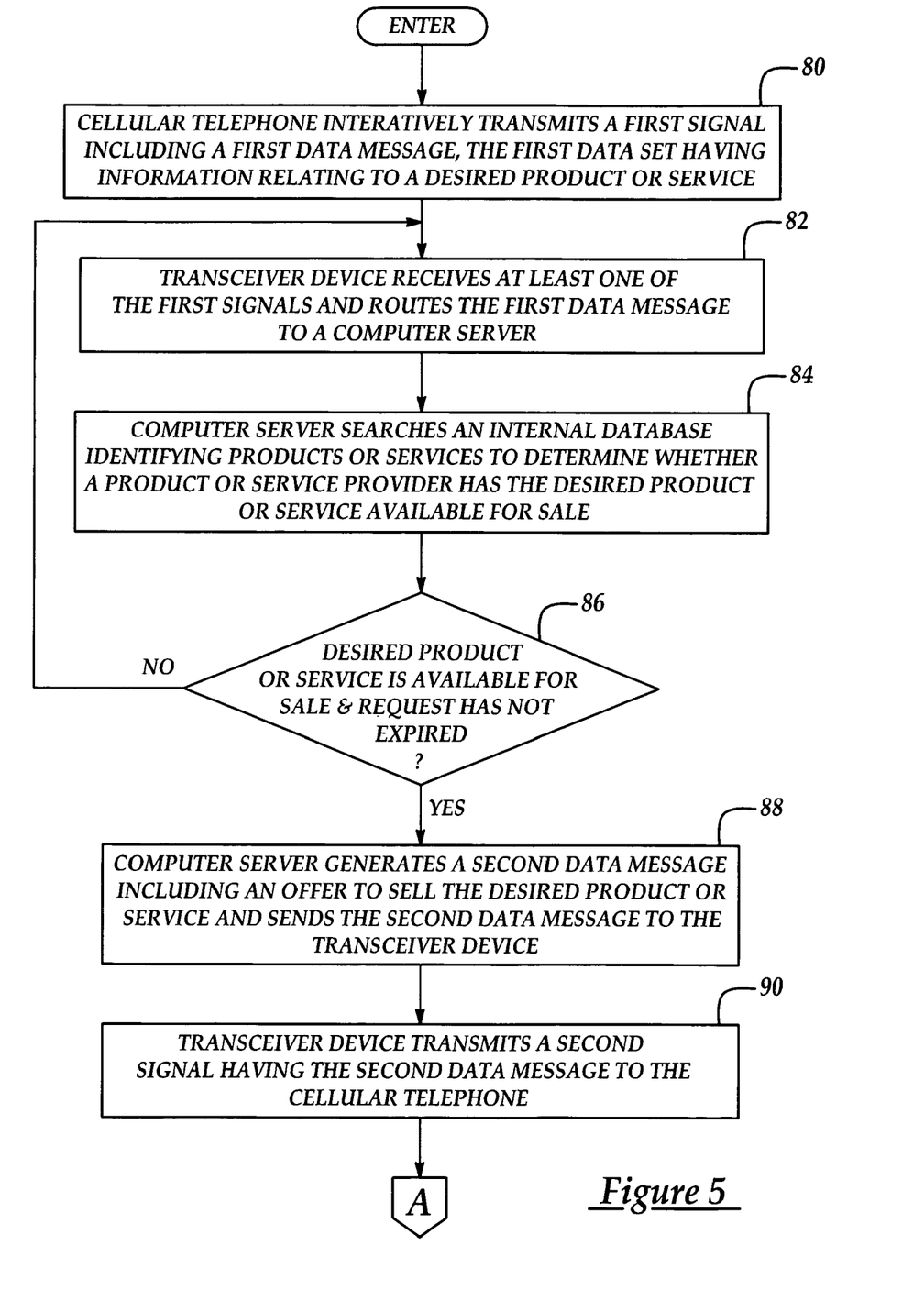
FIGS. 5 and 6 are flowcharts of a method for obtaining an offer for a sale of a product or service.
Figure 6:
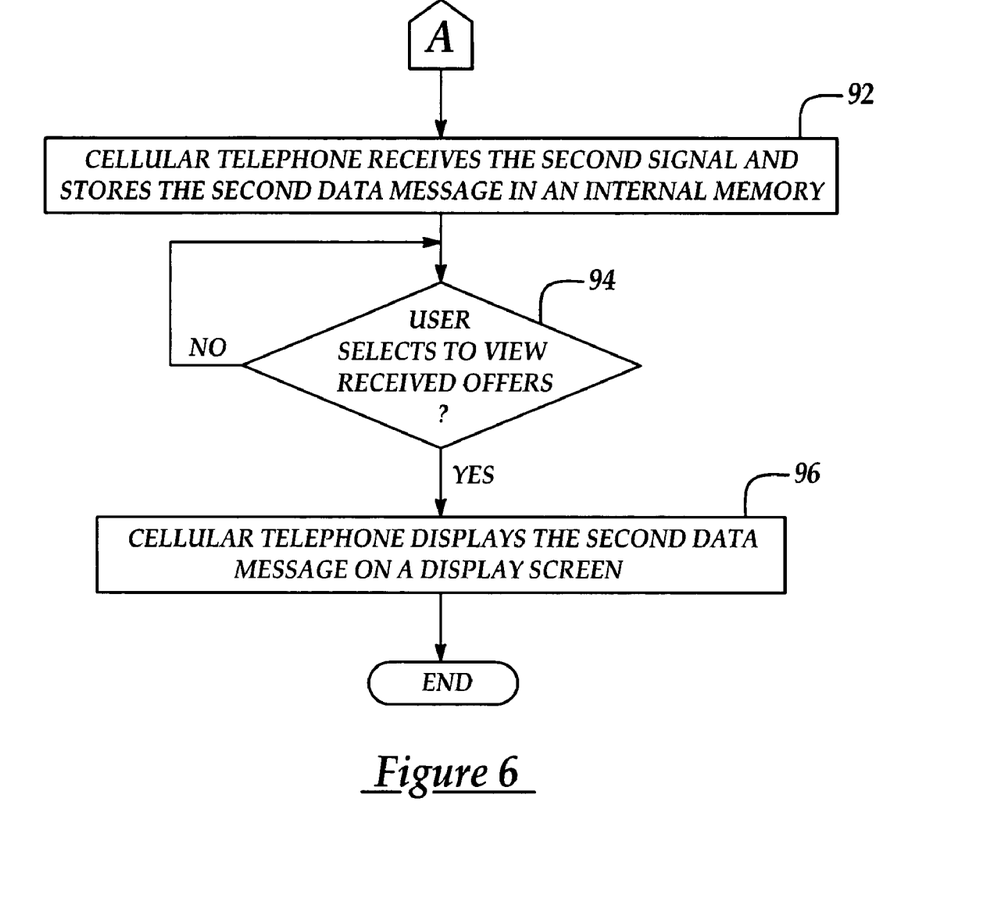

Referring to FIGS. 2, 5 and 6, a method for obtaining an offer for sale associated with a desired product or service will now be explained. Although cellular telephone 12 can receive data messages containing offers for sale from computer server 16 (associated with a first product/service provider) and computer server 20 (associated with a second product/service provider), the method will only describe offers for sale being received from computer server 16, for purposes of simplicity of understanding.

At step 80, cellular telephone 12 iteratively transmits a first signal including a first data message having information relating to a desired product or service. For example, cellular telephone 12 can transmit a first signal including a first data message 70 containing information on a desired product or service.

At step 82, transceiver device 14 receives at least one of the first signals and routes the first data message to computer server 16. In particular, device 14 routes the first data message 70 through I/O interface 50 to CPU 44.

At step 84, computer server 16 searches an internal database (not shown) listing products or services to determine whether a product or service provider has the desired product or service available for sale. In particular, CPU 44 searches a database stored in ROM 48 to determine whether a Product/Service Description data in the first data message matches data in a Product/Service Description field of the internal database.

At step 86, if computer server 16 determines that the product or service provider has the desired product or service available for sale, and in the current date and time has not exceeded the date and time listed in the Request Expiration Date field, the method advances to step 88. Otherwise, the method returns to step 82.

At step 88, computer server 16 generates a second data message including an offer to sell the desired product or service and sends the second data message to the transceiver device 14. In particular, CPU 44 generates the second data message 72 and sends message 72 via I/O interface 52 to transceiver device 14.

At step 90, transceiver device 14 transmits a second signal having the second data message to cellular telephone 12.

At step 92, cellular telephone 12 receives the second signal and stores the second data message 72 in ROM 26. In particular, transceiver 36 receives the second signal and transmits the second data message via I/O interface 28 to CPU 22.

At step 94, a CPU 22 monitors a key (not shown) on keypad 32 to determine whether a user has selected to view received offers for sale. If the value of step 94 equals "yes", the method advances to step 96. Otherwise, the method returns to step 94 to wait until the user has selected to view the received offers for sale.

At step 96, when the user has indicated a desire to view received offers for sale, cellular telephone 12 displays the second data message on a display screen 40. In particular, CPU 22 can display second data message 72 that comprises an offer for sale of a "Pioneer Car Radio XK102" on display screen 40.

As discussed above, the foregoing method discloses a single data message (e.g. data message 72) being received by cellular telephone 12. It should be noted, however, that cellular telephone 12 can receive a plurality of data messages from a plurality of products/service providers that are stored in ROM 26 by CPU 22. Further, each of the plurality of data messages can contain a separate offer for sale of a desired product or service. Thus, a user of cellular telephone 12 can view a plurality of data messages containing a plurality of offers for sale on display screen 40 to determine (i) the lowest price for a product or service and, (ii) the name of the product or service provider.

In an alternate embodiment, CPU 22 of cellular telephone 12 can be configured to display only the data messages having the most desirable offers for sale, received by telephone 12. In particular, CPU 22 can be configured to display on display screen 40 a predetermined number of data messages having offers for sale with the lowest prices (e.g., lowest Offering Price), as compared to the other data messages. Further, if a user does not view the received offers for sale by an offer expiration date, the CPU 22 can delete the expired offers for sale from its memory.

The present systems, methods, and a storage medium for obtaining an offer for a sale of a product or service represent a substantial advantage over other systems and methods. In particular, the inventive method utilizes a cellular phone to iteratively transmit a data message containing information relating to a desired product or service that can be received by product or service providers having transceiver units within a broadcast range of the cellular phone. When a product or service provider receives the data message, the provider can transmit a message containing an offer for sale of the desired product or service to the cellular phone. Thereafter, a user of the cellular phone can view the received offers for sale of the desired product or service—without having to spend substantial amounts of time looking through magazines and/or newspapers to determine where to purchase the product or service. Further, the user of the cellular telephone can compare prices from multiple offers for sale of the desired product or service or other desired criteria related to the product or service.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for obtaining an offer for a sale of a desired product or service using electronic devices, comprising:
   identifying the desired product or service for a single purchase transaction;
   iteratively transmitting a first signal including a first data message using a mobile transceiver device, the first data message having information relating to the desired product or service, the first signal being transmitted to product or service providers within a broadcast range of the mobile transceiver device regardless of identities of the product or service providers and abilities of the product or service providers to provide the desired product or service;
   receiving the first signal having the first data message and determining whether at least one of the product or service providers has the desired product or service available for sale;
   wherein iteratively transmitting the first signal further comprises cycling through multiple digital communication protocols to iteratively transmit the first signal;
   transmitting a second signal including a second data message to the mobile transceiver device, the second data message containing an offer to sell the desired product or service;
   receiving a plurality of additional offers to sell the desired product or service from a plurality of vendors prior to a completion of the single purchase transaction;
   organizing the offer to sell the desired product or service and the plurality of additional offers to sell the desired product or service on a screen of the mobile transceiver device prior to a completion of the single purchase transaction; and
   deleting a subset of the offer to sell the desired product or service and the plurality of additional offers to sell the desired product or service in response to the subset failing to meet a desired criterion prior to a completion of the single purchase transaction.

2. The method of claim 1 wherein the information in the first data message includes a product or service identifier and a desired price of the desired product or service.

3. The method of claim 2 wherein the information in the first data message further includes a request expiration date wherein an offer to sell the desired product or service is not desired after the request expiration date.

4. The method of claim 1 wherein the offer to sell the product or the service in the second data message includes a product or service identifier and a price of the desired product or service.

5. The method of claim 1 wherein the offer to sell the desired product or service in the second data message further includes an offer expiration date wherein the offer to sell expires after the offer expiration date.

6. The method of claim 1 wherein the mobile transceiver device comprises a cellular telephone.

7. The method of claim 1 wherein the product or service providers directly receive the first signal having the first data message at a store location.

8. The method of claim 1 wherein the transmission of the first signal occurs at predetermined time intervals.

9. The method of claim 1 wherein the mobile transceiver device comprises a cellular telephone including a display screen, the method further including:
   receiving the second signal by the cellular telephone; and
   displaying the second data message from the second signal on the display screen.

10. The method of claim 1 wherein iteratively transmitting the first signal includes iteratively transmitting the first signal through multiple communication protocols to transmit the first signal in each protocol.

11. The method of claim 1 wherein the second message containing the offer to sell the desired product or service includes a predetermined number of data messages having offers for sale with the lowest prices.

12. The method of claim 1 further comprising determining a first communication protocol to iteratively transmit the first signal.

13. The method of claim 12 further comprising determining a second communication protocol to transmit the second signal.

14. The method of claim 1 further comprising cycling through multiple communication protocols to transmit the second signal.

15. The method as claimed in claim 1 further comprising transmitting a third signal including a third data message to the mobile transceiver device, the third data message containing an additional offer to sell the desired product or service.

16. The method of claim 1 wherein the mobile transceiver device comprises a cellular telephone including a display screen and keypad, the method further including:
   receiving the second and third signal by the cellular telephone; and
   displaying the second and third data messages from the second signal and third signal, respectively, on the display screen in response to a generation of a signal indicative of a key selection from the keypad to view the second and third data massages.

17. The method of claim 1, wherein the multiple digital protocols include CDMA, TDMA, and GSM.

18. A storage medium encoded with machine-readable computer program code for obtaining an offer for a sale of a desired product or service, the storage medium including instructions for causing at least one device operatively associated with a system to implement a method comprising:
   identifying the desired product or service for a single purchase transaction;
   iteratively transmitting a first signal including a first data message using a mobile transceiver device, the first data message having information relating to the desired product or service, the first signal being transmitted to product or service providers within a broadcast range of the mobile transceiver device regardless of identities of the product or service providers and abilities of the product or service providers to provide the desired product or service;
   receiving the first signal having the first data message and determining whether at least one of the product or service providers has the desired product or service available for sale;
   wherein iteratively transmitting the first signal further comprises cycling through multiple digital communication protocols to iteratively transmit the first signal;
   transmitting a second signal including a second data message to the mobile transceiver device, the second data message containing an offer to sell the desired product or service;
   receiving a plurality of additional offers to sell the desired product or service from a plurality of vendors prior to a completion of the single purchase transaction;
   organizing the offer to sell the desired product or service and the plurality of additional offers to sell the desired product or service on a screen of the mobile transceiver device prior to a completion of the single purchase transaction; and
   deleting a subset of the offer to sell the desired product or service and the plurality of additional offers to sell the desired product or service in response to the subset failing to meet a desired criterion prior to a completion of the single purchase transaction.

19. The storage medium of claim 18, wherein the multiple digital protocols include CDMA, TDMA, and GSM.

* * * * *